United States Patent [19]

Baillie

[11] 4,354,389

[45] Oct. 19, 1982

[54] VAPOR PRESSURE SENSOR AND FLOW MEASURING DEVICES

[75] Inventor: Lloyd A. Baillie, Homewood, Ill.

[73] Assignee: Atlantic Richfield Company, Philadelphia, Pa.

[21] Appl. No.: 99,346

[22] Filed: Dec. 3, 1979

[51] Int. Cl.³ .................................................. G01L 9/00
[52] U.S. Cl. ...................................................... 73/749
[58] Field of Search ............... 73/747, 748, 749, 750, 73/861.66, 861.65, 702, 703, 293

[56] References Cited

U.S. PATENT DOCUMENTS

| | | | |
|---|---|---|---|
| 1,699,812 | 1/1929 | Sartakoff | 73/747 |
| 1,815,000 | 7/1931 | Durant | 73/747 |
| 1,955,315 | 4/1934 | Styer | 73/293 |
| 3,023,622 | 3/1962 | Hezarifend | 73/747 |
| 3,225,599 | 12/1965 | Schwien | 73/749 |
| 3,296,867 | 1/1967 | Schwien | 73/749 |
| 3,355,946 | 12/1967 | Lazell | 73/861.65 |
| 3,589,196 | 6/1971 | Van Dyck et al. | 73/703 |
| 3,611,811 | 10/1971 | Lissau | 73/747 |

FOREIGN PATENT DOCUMENTS 435547 10/1926 Fed. Rep. of Germany ........ 73/747

Primary Examiner—Donald O. Woodiel
Attorney, Agent, or Firm—Stanley M. Welsh

[57] ABSTRACT

Disclosed is a method and apparatus for measuring and/or continuously recording small pressure differences by means of a novel manometer-like device. Accuracies of plus or minus about 0.05 dynes/square centimeter are achieved by means of a disclosed device which can measure, record, and self-calibrate.

5 Claims, 4 Drawing Figures

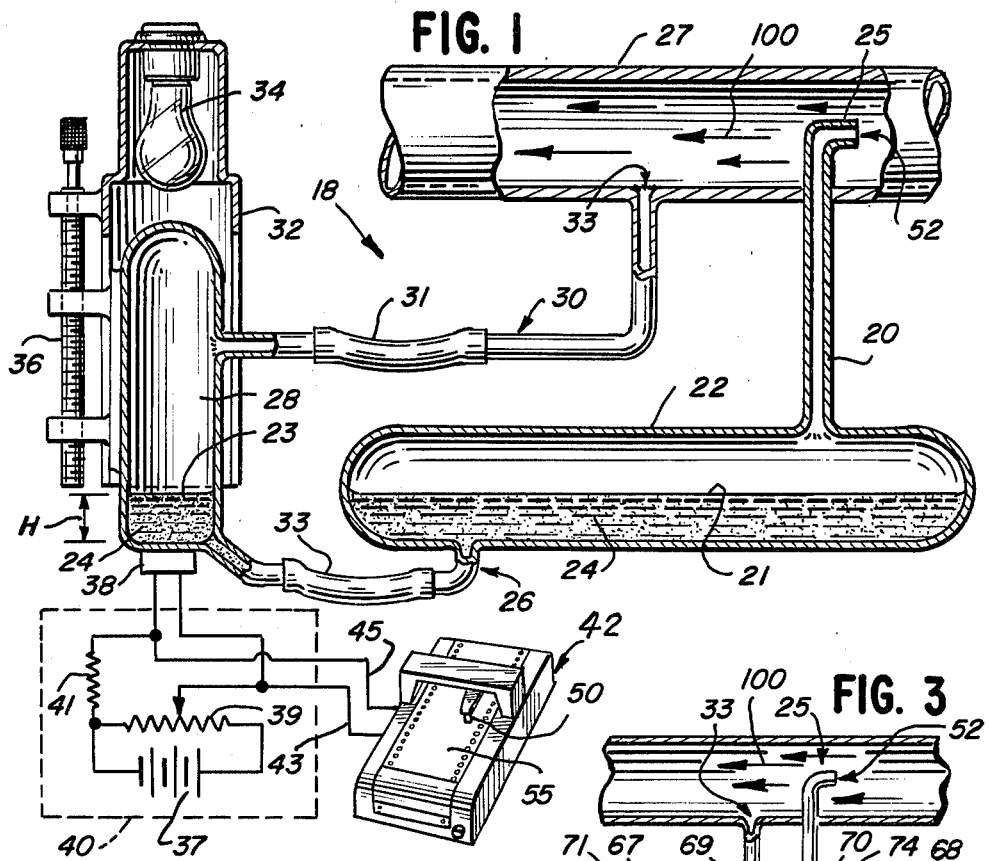
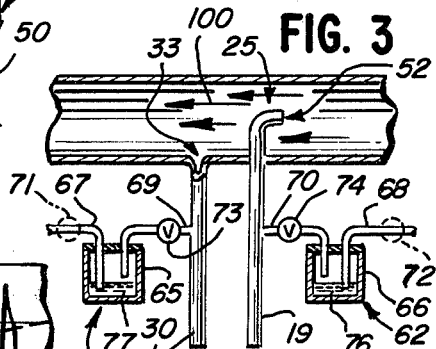
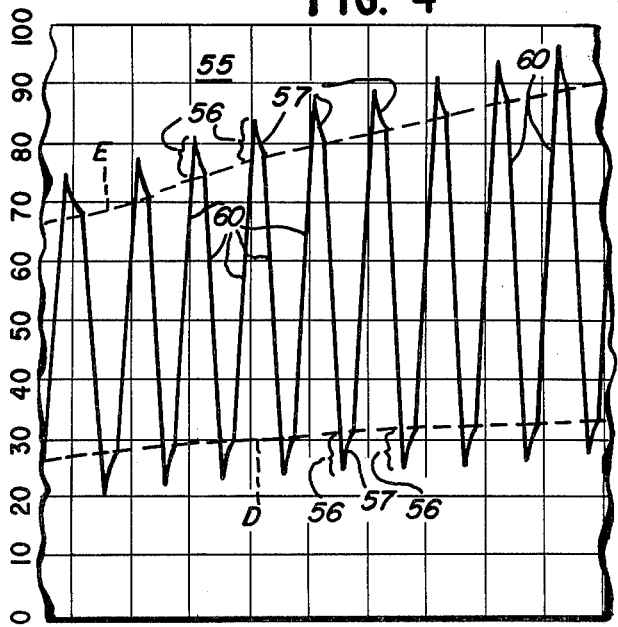
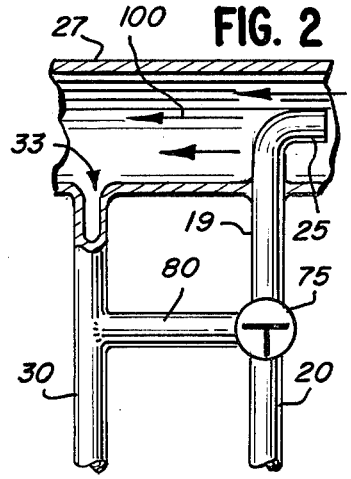

VAPOR PRESSURE SENSOR AND FLOW MEASURING DEVICES

BACKGROUND OF THE INVENTION

This invention relates to devices for measuring small pressure differences in fluids. More specifically, this invention relates to the measurement of small pressure differences in fluids which are in the range of about 0.1 to 1,000 dynes/square centimeter.

Numerous methods have been devised to measure fluid pressure differences. These methods include measuring relative height differences in a fluid as, for example, in a manometer-like device. A "manometer-like device" means throughout this specification and the claims a relative pressure measuring device wherein a first pressure is measured relative to a second pressure by balancing the difference in pressure between said first and said second pressure by a fluid head. A "fluid head" means throughout this specification and claims the product of the difference in relative heights between a first fluid level, e.g., a first liquid, and a second fluid level, e.g., a second liquid, times the density of said first and second fluid, when said first and second fluid are of the same density. More generally, a fluid head, where two immiscible fluids, e.g., liquids, make up the "fluid head" requires a balancing of the contributions made by each of the fluids, as would be clear to one of skill in the art. Two deficiencies associated with these manometer-like devices are that the measurement of small pressure differences is neither continuous nor easily adaptable to recording devices, such as millivolt recorders.

A pitot tube is a known device for measuring the rate of fluid movement. However, since the pressure differences in a pitot tube due to movement of a fluid can be very small, the usefulness of such a device is limited. For example, air at room temperature (72° F.) moving at a rate of about 0.46 ft/second gives rise to a water pressure differential of about one micron.

BRIEF DESCRIPTION OF THE INVENTION

It is an object of this invention to adapt a pitot tube to permit continuous monitoring and/or recording of flow rates as low as about half a foot per second of air at room temperature.

It is an object of this invention to provide a device which self-calibrates.

It is an object of this invention to provide a device capable of accurately measuring pressure differences of plus or minus as little as about 0.05 dynes/square centimeter.

It is an object of this invention to provide an improved process for measuring pressure differentials by means of manometer-like devices.

Other objects of this invention will be clear based upon this specification.

One embodiment of this invention is a first device capable of accurately measuring pressure differences of plus or minus as little as about 0.05 dynes/square centimeter. This first device comprises a reservoir, a measuring cell, a first liquid in the reservoir, a second liquid in the measuring cell, a transferring means for transferring at least a portion of the first liquid and the second liquid, a first means for sensing a first pressure, a second means for sensing a second pressure, a detector means which produces a response signal which varies depending upon a signal interacting therewith, and a signal source for producing such a signal. The reservoir is connected to the measuring cell by the transferring means. The first liquid and the second liquid contained in the reservoir and the measuring cell, respectively, can flow between the reservoir and the measuring cell through the transferring means. The first means is connected to the reservoir so that the first pressure impinging upon the first means is transmitted in a substantially undiminished degree to a surface of the first liquid. The second means is attached to the measuring cell, so that a second pressure impinging on the second means is transmitted in a substantially undiminished degree to a surface of the second liquid. With the first device connected as hereinabove described, changes in relative value between the first pressure and the second pressure produces changes in an amount of the second liquid in the measuring cell. The signal source is located in a position relative to the second liquid so that a characteristic of a signal from the signal source is modulated or modified to produce a modulated signal. The characteristic of the signal varies with the amount of the second liquid. The detector means responds to the characteristic of the modulated signal by producing a response signal. The response signal changes in an amount related to changes in the characteristic of the modulated signal. A means for measuring can be used to convert the response signal into an observable quantity or measurement. For example, a characteristic of a light signal is intensity. This intensity will vary depending upon the amount of second liquid in the measuring cell when such light is transmitted through a thickness of the second liquid in the measuring cell where the thickness varies as the amount of liquid in the measuring cell varies. The amount by which the intensity of the signal varies with the thickness or width is discussed in more detail in an example.

The detector produces a response signal in response to a modulated signal. The response signal varies by an amount related to the amount that the characteristic of the signal is changed. An example of a response signal is voltage directly proportional to the resistance of a photoresistant material, such as cadmium sulfide. The resistance of cadmium sulfide varies depending upon the intensity of light impinging thereon.

The signal provided by the signal source of this invention must have a characteristic (1) which is modulated by the second liquid by an amount which depends upon the quantity of the second liquid in the measuring cell and (2) which induces a particular type of response signal from a detector. The particular response signal must be related to the amount by which the characteristic of the signal from the signal source was modulated by the second liquid. A preferred way to modulate a signal is in relation to the intensity of the signal. Selected liquids having an appropriate k value defined in relation to Beer's Law are particularly advantageous in this invention. The density of such liquids can vary over a wide range of values. However, the less dense the liquid, all other factors being equal, the greater the amount of such liquid transferred between the measuring cell and the reservoir in response to a fixed pressure differential between the first and second means. Examples of such liquids suitable for use in this invention are water, alcohols, ethers and the like. Preferably, such liquids will have a sufficiently low vapor pressure so as not to volatilize rapidly or to any great extent. For example, liquids having a density in grams/cubic centimeter in the range of about 0.6 to about 2 can be used, provided they have a vapor pressure in the range of about 0 to 5 grams/square centimeter at about 72° F. Liquids containing a dye or signal absorber are particularly advantageous. A liquid having a k value defined in relation to Beer's Law in the range of about 0.1 to about 1000 preferably can be used. However, all other factors being equal, the lower the k value the lower the amount of modulation and hence the lower the sensitivity as discussed in an example. However, if the k value becomes too large, all other factors being equal, the amount of modulated signal which will reach the detector becomes too small to be easily measured or detected and problems from vibrations begin to occur. More preferably, the k value in reciprocal centimeters ($cm^{-1}$) is in the range of about 10 to 500, and still more preferably is in the range of about 50 to about 200.

Depending upon either the signal used, or the dye or signal absorber used, the k value in Beer's Law can be frequency dependent. To avoid a complicated Beer's Law dependence involving frequency, either the dye or signal absorber selected for use preferably has a k value which is substantially not frequency dependent, and/or the signal selected for use is limited to a range of frequencies wherein the k value of the dye or signal absorber is preferably substantially constant. One way to limit the range of frequencies of the signal is by means of appropriate filters.

A means for measuring changes in the response signal of the detector is connected to the detector to permit such measurement. An example of a response signal is voltage or resistance converted into voltage. An example of a means for converting resistance into a voltage is a measuring circuit shown in FIG. 1.

Another embodiment of this invention is a second device for continuously monitoring flow rates of a fluid by means of a pitot tube. This second device comprises the first device wherein the first means or the second means provides a fluid, e.g., vapor, communication between a pitot tube and the reservoir or measuring cell, respectively. The pressure created at the orifice of the pitot tube is transmitted by either the first means or the second means, respectively, preferably in a substantially undiminished degree to a surface of the first liquid contained in the reservoir or the second liquid contained in the measuring cell, respectively. In other words, the first pressure or the second pressure, respectively, described with respect to the first device is produced in a pitot tube. The means to which the pitot tube is not attached has a fixed orifice which is oriented substantially perpendicular to the direction defined by the orifice of the pitot tube and which is in the flow of the same fluid that impinges on the orifice of the pitot tube. In other words, the pressure on the fixed orifice corresponds to a pressure substantially transverse to the flow of that fluid impinging on the orifice of the pitot tube.

Still another embodiment of this invention is a third device capable of self-calibration. This third device comprises the first device wherein there is in addition, an equalizing means for equalizing the pressures transmitted by the first and second means. This equalizing means can, for example, comprise one or more conduits to connect the first and second means of the first device to a source of fluid, e.g., vapor, at the same pressure. In a more specific and preferred embodiment, the equalizing means comprises a fluid conduit or fluid passageway with a valve means. The conduit at one end is attached to the first means and at the other end is attached to the second means. The valve having at least two positions, one open and one closed, regulates the flow of fluid through the conduit. With the valve open, vapor flows between the first and second means until the pressure at each end of the conduit is equalized. With the valve closed, any pressure difference between the ends of the conduit remains unaffected.

The equalizing means can be used with the second device described above. However, the valve of the equalizing means is preferably located so that the first means is closed off from the pitot tube while the passageway, which is used to equalize the pressures transmitted by the first and second means, is opened.

A particularly useful detector for this invention employs a photoresistant element, such as those made of cadmium sulfide and/or other suitable materials A photoresistant material or element is one whose resistance characteristic varies in relation to the intensity of a signal interacting therewith. Cadmium sulfide, for example, has a resistance that varies inversely with the intensity of electromagnetic radiation impinging thereon over a wide frequency range of such radiation, as is well known in the art. Employing a circuit such as disclosed in FIG. 1, the voltage drop across the photoresistant element can be applied to a millivolt recorder. Continuous monitoring and recording of any changes in such voltage are readily achieved.

Optionally, a means for maintaining the composition of a fluid in the first means and/or the second means during operation of any of the devices described herein before can be usefully employed. A suitable means for maintaining the composition of the fluid in the first means and/or the second means is a means for introducing a flow of a fluid into the first and/or second means. An example, of such a means for introducing a vaporous fluid is a bubbler.

Finally, still another embodiment of this invention, is an improved process or method for measuring pressure differentials by means of manometer-like devices wherein differences in pressure transmitted by a first pressure sensing means and a second pressure sensing means produces changes in a first fluid level defined by a first liquid in one portion of said manometer-like device relative to a second fluid level defined by a second liquid in another portion of said manometer-like device. This improved process comprises measuring changes in the first fluid level by causing a signal to interact with the first liquid so that a characteristic of the signal is modulated to produce a modulated signal, wherein the characteristic varies with the first fluid level and measuring changes in the characteristic of the modulated signal.

An example of a modulated signal is electromagnetic radiation wherein the intensity characteristic of that radiation has been changed upon transmission through a liquid. Modulation due to transmission, for example, through a liquid thickness or width that varies with changes in relative pressure between the first pressure sensing means and the second pressure sensing means of a manometer-like device can be used to measure changes in the fluid-head as discussed in an example.

Optionally, the improved process can further comprise equalizing the pressures transmitted by the first and the second pressure sensing means of the manometer-like device, each as the third device described hereinabove. The purpose of equalizing the pressures transmitted by at the first and second pressure sensing means is to define the point at which both liquids are at substantially the same height. Accordingly, any change from this height represents either an increase or decrease in the relative height of the first and/or the second liquid levels.

DETAILED DESCRIPTION OF THE INVENTION

FIG. 1 is a preferred embodiment shown in part schematically and in part in partial cross section.

FIG. 2 is a view of the pipe connections from the preferred embodiment of this invention to a large diameter pipe.

FIG. 3 is an alternate form of the connections shown in FIG. 2, but with purging bleeds and no cross connecting conduit.

FIG. 4 is a representation of a portion of a strip chart from a millivolt recorder such as in FIG. 1.

In FIG. 1, there is a photocell manometer 18 consisting of a first means or conduit 20, a reservoir 22 containing a liquid 24, a pitot tube 25, a conduit or connection 26, a measuring cell 28, a second means or conduit 30, a support 32, a light or signal source 34, a threaded shaft or screw 36, a detector 38, a measuring circuit 40, and a millivolt recorder 42. Conduit 26 includes a flexible conduit portion 33, and conduit or first means 30 includes a flexible conduit portion 31 to permit some movement between measuring cell 28 and reservoir 22.

Pitot tube 25 is disposed in conduit 27. Orifice 52 of pitot tube 25 is perpendicular to the direction of flow shown by arrows 100. Pitot tube 25 is connected to a first means 20. First means 20 is connected to enclose reservoir 22 containing a liquid 24 so that the pressure produced at the orifice 52 by the flow in conduit 27 is transmitted in a substantially undiminished degree or amount to the surface 21 of liquid 24. A second means 30 transmits pressure at orifice 33 to surface 23 of liquid 24 in measuring cell 28. Orifice 33 is oriented so that a plane defined by orifice 33 is parallel to the direction of flow indicated by the arrows 100. Conduit 26 connects reservoir 22 to measuring cell 28 so that liquid 24 can move between measuring cell 28 and reservoir 22 in response to pressure changes within the first means relative to that in the second means. Although in FIG. 1 pitot tube 25 is connected to first means 20 and orifice 33 leads to the interior of second means 30, a alternative can be used wherein pitot tube 25 is connected to second means 30 and orifice 33 leads to the interior of first means 20.

Support 32 supports both measuring cell 28 and signal source 34. Measuring cell 28 along with detector 38 can be moved very accurately relative to reservoir 22 by means of threaded screw 36. A change in position of measuring cell 28, relative to reservoir 22, produces a change in H. As discussed in more detail in an example, the amount of light or signal transmitted through liquid 24 can be used to determine changes in H and hence pressure differences.

Briefly, the operation of the photocell manometer 18 of FIG. 1 is described hereinafter. Pressure at the orifice 52 of pitot tube 25 is transmitted through or by first means 20 and causes some of the liquid 24 in reservoir 22 to be transferred through conduit 26 to measuring cell 28. The amount of liquid 24 transferred will depend upon the difference in pressure on surfaces 21 and 23 and the relative sizes of areas defining surfaces 21 and 23. All other factors being equal, the greater the pressure difference, the more liquid 24 that will be transferred. The amount of liquid 24 transferred directly relates to differences in H shown in FIG. 1.

Measuring cell 28 can be moved very accurately to different heights or levels relative to reservoir 22 by means of threaded shaft 36. A signal source 34 (powered by a source not shown) transmits electromagnetic radiation, e.g., light radiation, through liquid 24 to detector 38.

Measuring circuit 40, consisting of a constant voltage source or battery 37 and resistors 39 and 41, is connected across detector 38. Variable resistor 39 permits a controlled amount of voltage to be drawn from battery 37 and imposed across resistor 41 and detector 38. Resistor 41 and detector 38 are in series with one another. The voltage differences across detector 38 is measured and recorded by means of millivolt recorder 42. Battery 37, for example, can have a voltage of 1.5 volts when resistor 39 has a variable resistance of from 0 to 1,000 ohms and resistor 41 has a resistance of about 100,000 ohms. Detector 38 preferably uses cadmium sulfide.

Measuring circuit 40, shown schematically, converts the resistance across detector 38 into a voltage differential across detector 38. This voltage differential across detector 38 is measured and recorded by millivolt recorder 42 on a strip chart 55. FIG. 4 is an enlarged view of a strip chart 55 from millivolt recorder 42.

The apparent resistance across detector 38 will vary depending upon the intensity of light radiation impinging thereon. The amount of transmitted light radiation reaching detector 38 from light source 34 will vary, all other factors to be discussed hereinafter being equal, logarithmically with the height H of liquid 24.

In a preferred embodiment, the transmittance characteristics of liquid 24 will follow a simple form of Beer's Law, i.e., $I/I_0 = e^{-kH}$. The k is a constant which can be determined by a calibration procedure discussed in an example. Carbon black or graphite e.g., in an india ink solution of about one percent (1%) has been found particularly suitable in this invention. The value of k in reciprocal centimeters is preferably in excess of 50. The larger the value of k, the more sensitive is the instrument. If k becomes too large, e.g., much above 1000, minute vibrations can become a serious problem and/or the intensity of transmitted light can become diminished to a point that makes detection difficult. Preferably, k has a value in the range of about 50 to about 200 reciprocal centimeters.

Variables in photocell manometer 18 that can both affect millivolt recorder readings and be avoided by an automatic self-calibration, to be described in more detail hereinafter with respect to FIG. 4, are: (1) variations in light or signal intensity from light or signal source 34, (2) variations in voltage of battery 37, (3) changes in temperature of liquid 24, and (4) mechanical stresses which slowly change the configuration of the photocell manometer system. Changes in light intensity from signal source 34 can arise, for example, in two (2) ways. The first way is the result of aging of the bulb of signal source 34 and the second way is due to variations in line voltage from a power source not shown to the bulb of light source 34. Variations in voltage of battery 37 can occur over time as energy is continuously being drawn from battery 37. Mechanical stresses on housing can arise, for example, from changes in dimension of flexible conduit portion 33, reservoir 22 or measuring cell 28. Such changes due to mechanical stresses are expected to be insignificant. By "slowly" is meant slow in comparison to the duration of a calibration cycle. A calibration cycle is discussed with respect to FIG. 4.

FIG. 2 discloses a portion of FIG. 1 consisting of conduits 20, 27, and 30 and pitot tube 25. In addition, there are conduits 19 and 80, and a valve 75. Connections that can be used function as those discussed in FIG. 1, i.e., to transfer a pressure in a substantially undiminished degree.

The portion of FIG. 1 disclosed in FIG. 2 functions as described hereinafter. The pressure produced due to orientation of pitot tube 25 and the flow indicated by arrows 100 is transmitted into conduit 19. Valve 75 rotated in a counter-clockwise direction by 90° (out of 360°) from the position shown in FIG. 2 opens a passageway between conduits 19 and 20, while sealing off conduit 80. Pressure in conduit 19 is transmitted into conduit or first means 20. As discussed with respect to FIG. 1, pressure substantially undiminished in amount is transmitted by first means or conduit 20 to the surface 21 of liquid 24 in reservoir 22 (not shown). Valve 75, in the position shown in FIG. 2, closes the passageway between conduits 19 and conduit 20 while opening the passageway between conduits 20 and 80. The conduit 80 is a fluid passageway connecting conduit 30 and conduit 20. When conduit 80 is open between conduit 20 and 30, the pressure in conduit 20 and 30 are equalized. Although a particular valve is shown, other valves functioning in the same manner can be used and automated so that in a controlled and periodic manner, the pressures between conduits 20 and 30 can be equalized so as to provide the self-calibration discussed in more detail with respect to FIG. 4.

There is a potential problem associated with the arrangement shown in FIG. 2 if conduit 19 becomes too long, for example, longer than about five centimeters, and if the gas flowing in conduit 27 has a different density from the gas contained in conduits 19 and 20, then the difference in density of the gases in conduits 19 and 30 can result in a pressure differential based on the difference in weight of the gases in these different conduits. In other words, in addition to the pressure difference resulting from the pressure due to flow caused in pitot tube 25, an additional component of pressure can arises from the difference in weight of the fluids in conduits 19 and 20 verses that in conduit 30. Clearly one method of avoiding this problem is to insure that conduit 19 is as short as possible. Another solution is discussed with respect to FIG. 3.

In FIG. 3 in addition to the components of FIG. 2, two bubblers 61 and 62 are shown. Bubbler 61 is tied into conduit 30, and bubbler 62 is tied into conduit 19. Bubbler 61 comprises a sealed reservoir 65, an inlet 67, an outlet 69, and a valve 71 shown in phantom outline, and a valve 73. Bubbler 62 comprises a sealed reservoir 66, an inlet 68, an outlet 70, a valve 72 shown in phantom outline, and a valve 74.

The purpose of bubblers 61 and 62 is to insure that the gas in conduit 30 and 19 are the same. This is done by providing a flow of gas into conduits 30 and 19 from bubblers 61 and 62, respectively. In applications where the pressure within conduit 27 is below atmospheric pressure valves 71 and 72 can be omitted and valves 73 and 74 used alone. When valve 74 and 72 are open, a source of vapor at a higher pressure enters inlet 68 to sealed reservoir 66. This vapor passes through liquid 76 and exits outlet 70. This vapor continues into conduit 19 and eventually exits through orifice 52 of pitot tube 25. Provided the flow of gas through the bubbler is kept sufficiently slow, the pressure reading in conduit 20 will be unaffected. Bubbler 61 functions in a similar fashion to bubbler 62 described hereinbefore. Briefly, when valves 71 and 73 are open, vapor enters inlet 67 passes through liquid 77 in reservoir 65 and exits outlet 69. This vapor passes into conduit 30 and eventually exits through orifice 33. Provided the flow of gas through bubbler 61 is kept sufficiently slow, the pressure in conduit 30 will be uneffected. The purpose of bubblers 61 and 62 is to maintain the same density vapor in conduits 30, 19, and 20.

Still another method of avoiding the problem from different density gases entering into conduits 19, 20, and 30 is to have the first and second means 30 and 20 enter horizontally into conduit 27 and be at approximately same height. With substantially no difference in relative heights between the conduits leading to reservoir 21 and measuring cell 28, problems associated with fluids of different densities in conduits 19, 20 and 30 do not arise.

FIG. 4 represents a strip chart 55 from millivolt recorder 42. A recording pen 50 moves an amount linearally proportional to the potential difference due to input of leads 43 and 45. The strip chart itself is driven at a suitable speed to provide a time component to transverse movement of recording pen 50. When there is no voltage difference between input leads 43 and 45, pen 50 is zeroed to read 0 on the strip chart. In the operation of this invention, pen 50 will usually register something other than 0 because detector 38 will usually have some potential difference across itself when operating properly. When the pressure difference on surfaces 21 and 23 are equal, base line D is the value recorded by pen 50 due to a potential difference across detector 38. Top line E is the value recorded, when there is some pressure difference between surfaces 21 and 23. Such pressure differences cause a change in height H of FIG. 1, which in turn changes the intensity of light impinging on detector 38. Changes in light intensity impinging on detector 38 result in changes in a measurable characteristic, e.g. the internal resistance, of detector 38. Changes in the internal resistance of detector 38 result in changes in voltage drop measured across detector 38. These voltage drops across detector 38 are preferably linearly proportional to changes in the intensity of light impinging upon detector 38. The changes in intensity of light impinging upon detector 38 are in turn logarithmically related to changes in the height H of liquid 24.

The pen 50 produces a continuous line on strip chart 55. This line consists of a substantially linear portion 60 and a non-linear asymptotic portion 57. Millivolt recorder 42 moves the pen by means of a null circuit commonly known in the art. The pen moves until a null point is reached. Because of the momentum of pen 50 the null point can be exceeded by an over-shoot portion 56. Pen 50 then asymptotically reaches the true null point along curved line 57. The true readings for the actual voltage drop across detector 38 are defined by dotted lines D and E which tangentially intersect the most linear end portion of asymptotic or curved lines 57.

As derived in the example, the ratio of $V_d$ the value in volts of base line D, to $V_e$ the value in volts of top line E is very close to the value of the ratio of $R_0$, the internal resistance across detector 38 when the pressure on surfaces 21 and 23 are equal, to R, the internal resistance of detector 38 when there is some pressure difference between surfaces 21 and 23, provided $V_w$, the total voltage dropped across detector 38 and resistor 41 is much larger than the voltage drop across detector 38, i.e. $V_d/V_e$ substantially equals $R_0/R$, provided $V_w$ is much larger than the individual voltage values $V_d$ and $V_e$.

A calibration cycle includes at least one measurement, e.g. Vd, wherein the pressures on surfaces 21 and 23 have been equalized, and at least one measurement, e.g. Ve, wherein the pressure on surfaces 21 and 23 are unequal.

The following examples are intended to illustrate the invention of this specification. However, variation thereon would be apparent to one of skill in the art based upon this specification. All such variations are intended to be within the scope of the invention of this specification.

EXAMPLE

Beer's Law for scatter of light radiation of frequency f through a liquid of thickness H is: $I_f/I_f^0 = e^{-k_f H}$ where $I_f^0$ is the initial intensity of light radiation of a particular frequency f; $I_f$ is the intensity of light of frequency f transmitted through a layer of liquid of thickness H; and $k_f$ is a physical constant characteristic of the liquid.

For an india ink solution of about 1%, the $k_f$ of Beer's Law for all frequencies of light from a 100 watt bulb are substantially equal. This avoids any problems from using light having different frequencies and different intensities for each such frequency, i.e. Beer's Law simplifies to $I/I^0 = e^{-kH}$.

Any change in the initial intensity, $I^0$, results in a proporational change in the transmitted intensity, I, so that the ratio of $I/I^0$ is unchanged. Consequently, changes in the intensity of light transmitted by a light source due to factors such as changes in line voltage or age of light source, e.g. bulb 34, do not affect the ratio of $I/I^0$ or the H value observed.

Because of the nature of a photoresistor utilizing, for example cadmium sulfide, the internal resistance, R, of the photoresistor is a constant divided by the intensity of light impinging on the photoresistor. Therefore, the ratio $R/R^0$ is equal to the ratio $I^0/I$.

If $V_e/V_d$ is equal to $R/R^0$, then any change due to system variables such as battery voltage changes, temperature changes and mechanical stresses which do not affect the value of H observed also will not affect the ratio of $V_e/V_d$. This is so because $I/I^0$ are only affected by changes in H, provided k remains constant.

Demonstration that:

$V_e/V_d = I^0/I = R/R^0$ for the measuring circuit 40 shown in FIG. 1, wherein R = internal resistance of detector 38 when a light of intensity I is impinging thereon;

$R^0$ = internal resistance of detector 38 when a light of intensity $I^0$ is impinging thereon;

$V_e$ = the observed millivolt value recorded on a strip chart when the pressure difference on surfaces 21 relative to surface 23 results in a level difference of H;

$V_d$ = the observed millivolt value recorded on a strip chart when the pressures on surfaces 21 and 23 are equal;

$V_w$ = voltage across resistor 41 and detector 38, a constant; and $R_c$ = resistance of resistor 41, a constant.

$$V_e/V_w = R/(R + R_c) \quad (1)$$

$$V_d/V_w = R^0/(R^0 + R_c) \quad (2)$$

from equation (1)

$$(V_e)(R_c) = R(V_w - V_e) \quad (3)$$

from equation (2)

$$(V_d)(R_c) = R^0(V_w - V_d) \quad (4)$$

dividing equation (3) by equation (4):

$$V_e/V_d = (R/R^0)[(V_w - V_e)/(V_w - V_d)] \quad (5)$$

since Vw is much greater than Ve and Vd $[(V_w - V_e)/(V_w - V_d)]$ is very close to a value of 1, and therefore equation (5) simplifies to:

$$V_e/V_d = R/R^0$$

Also since $I^0/I = R/R^0$ based upon the inherent character of photoresistor 38, therefore, $$V_e/V_d = R/R^0 = I^0/I.$$

Determination of Constant k

A 1% solution of Higgins India Ink in distilled water was used. The constant k for such a solution was found as follows.

$$I/I^0 = e^{-kH} \text{ (Beer's Law for an india ink solution)}$$

$$k = [\ln(I^0/I)]/H$$

Threaded screw 36 had 20 turns/inch.

The area of measuring cell 28 is 3.73 square centimeters.

The area of the reservoir 22 is 29.9 square centimeters.

d(H) is the change in height of H due to movement of the measuring cell relative to the reservoir. A movement upward relative to the reservoir will decrease H by d(H), i.e. to a value of H − d(H).

$$d(H) = \frac{(3.73)}{(3.73 + 29.9)} \cdot \frac{(2.54)}{(20)} (w)$$

w is the number of complete turns of threaded screw 36.

For a given number of turns w, $V^0/V$ is measured. Since $V^0/V = I^0/I$ therefore k is calculated from $$k = \frac{\ln(V^0/V)}{\frac{(29.9)}{(3.73 + 29.9)} \cdot \frac{(2.54)}{(20)} (w)}$$

$V^0$ = the voltage observed before movement due to w revolutions of the threaded screw.

V = the voltage observed after movement due to w revolutions of the threaded screw.

The value for k was determined to be 94.9 $cm^{-1}$.

Determination of Sensitivity

The smallness of size of d(H) that can be detected by the device of this invention is a measure of the sensitivity of the device.

Since $d(H) = [\ln(V^0/V)]/k$ the sensitivity for a given V° and V by which d (H) can be measured is inversely proportional to the size of k. For example, assume $k=100$ cm$^{-1}$, and the change in observed V was 1%, i.e. V°=101 and V=100, then the value of d(H) calculated from the above equation is about $10^{-4}$ centimeters or 1 micron. A 0.1 dyne/square centimeter is equivalent to 1 micron difference in height of water at about 72° F.

Determination of Flow Rate

A determination of the flow of a gas flowing in conduit 27 having an inside diameter of 0.8 inches was carried out using the arrangement shown in FIG. 1. A ¼" pitot tube was used.

The ratio of $V_0/V$ measured by means of photocell manometer 18 was 3.10.

From the following calculations a velocity, Vel., of 4.85 feet/sec or 147.8 cm/sec, for the gas in conduit 27 was found.

Del.(P)=1.1248 D1 ln($V_0/V$)/k where k is 94.9 cm$^{-1}$

D1, the density of the India ink in the photocell manometer is 1 gram/cubic centimeter.

Using the Velocity Head Equation:

$$Del.(P) = (Dv \cdot Vel^2)/2g$$

where Dv is the density of the gas in conduit 27
$Vel^2$ is the velocity squared of the gas
The following expression can be derived:

$$Vel = 46.95((1/k)(D1/Dv)/(\ln V_0/V))^{\frac{1}{2}}$$

Vel=147.8 cm/sec. or 4.85 feet/sec.

What is claimed is:

1. A device for measuring differences in pressure comprising: a reservoir, a measuring cell, a first liquid in said reservoir, a second liquid in said measuring cell, a transferring means providing liquid communication between said reservoir and said measuring cell, a first means for sensing a first pressure, a second means for sensing a second pressure, a detector means which responds to a modulated signal by producing a response signal of voltage potential, and a signal source for producing a signal of electromagnetic radiation; wherein
said reservoir is connected to said measuring cell by said transferring means in such a manner that at least a portion of said first liquid and said second liquid contained in said reservoir and said measuring cell, respectively, can flow therebetween, said first means is connected to said reservoir so that a first pressure impinging upon said first means is transmitted in a substantially undiminished degree to a surface of said first liquid, said second means is attached to said measuring cell so that a second pressure impinging on said second means is transmitted in a substantially undiminished degree to a surface of said second liquid; whereby changes in relative value between said first pressure and said second pressure produces changes in an amount of said second liquid in said measuring cell; said signal from said signal source is adapted to interact with said second liquid so that a characteristic of intensity of said signal is modulated to produce a modulated signal, wherein said characteristic varies with said amount of said second liquid, said detector means is adapted to respond to said characteristic of said modulated signal by producing a response signal that is changed in an amount related to changes in said characteristic of said modulated signal.

2. A device for measuring differences in pressure comprising: a reservoir, a measuring cell, a first liquid in said reservoir, a second liquid in said measuring cell, a transferring means providing liquid communication between said reservoir and said measuring cell, a first means for sensing a first pressure, a second means for sensing a second pressure, a detector means which responds to a modulated signal by producing a response signal, and a signal source for producing a signal; wherein
said reservoir is connected to said measuring cell by said transferring means in such a manner that at least a portion of said first liquid and said second liquid contained in said reservoir and said measuring cell, respectively, can flow therebetween, said first means is connected to said reservoir so that a first pressure impinging upon said first means is transmitted in a substantially undiminished degree to a surface of said first liquid, said second means is attached to said measuring cell so that a second pressure impinging on said second means is transmitted in a substantially undiminished degree to a surface of said second liquid; whereby changes in relative value between said first pressure and said second pressure produces changes in an amount of said second liquid in said measuring cell; said signal from said signal source is adapted to interact with said second liquid so that a characteristic of said signal is modulated to produce a modulated signal, wherein said characteristic varies with said amount of said second liquid, said detector means is adapted to respond to said characteristic of said modulated signal by producing a response signal that is changed in an amount related to changes in said characteristic of said modulated signal, wherein a microvolt recorder is connected to said detector so as to measure said response signal.

3. A device for measuring differences in pressure comprising: a reservoir, a measuring cell, a first liquid in said reservoir, a second liquid in said measuring cell, a transferring means providing liquid communication between said reservoir and said measuring cell, a first means for sensing a first pressure, a second means for sensing a second pressure, a detector means which responds to a modulated signal by producing a response signal, and a signal source for producing a signal of electromagnetic radiation; wherein
said reservoir is connected to said measuring cell by said transferring means in such a manner that at least a portion of said first liquid and said second liquid contained in said reservoir and said measuring cell, respectively, can flow therebetween, said first means is connected to said reservoir so that a first pressure impinging upon said first means is transmitted in a substantially undiminished degree to a surface of said first liquid, said second means is attached to said measuring cell so that a second pressure impinging on said second means is transmitted in a substantially undiminished degree to a surface of said second liquid; whereby changes in relative value between said first pressure and said second pressure produces changes in an amount of said second liquid in said measuring cell; said signal from said signal source is adapted to interact with said second liquid so that a characteristic of intensity of said signal is modulated to produce a modulated signal, wherein said characteristic varies with said amount of said second liquid, said detector means is adapted to respond to said characteristic of said modulated signal by producing a response signal that is changed in an amount related to changes in said characteristic of said modulated signal, wherein a microvolt recorder is connected to said detector so as to measure said response signal, wherein said first liquid and said second liquid have a k value in reciprocal centimeters defined in relation to Beer's Law for said first and second liquids in the range of about 0.1 to 1000.

4. The device of claim 3, wherein said k value is in the range of about 50 to about 200, whereby a device capable of measuring very small differences between said first pressure and said second pressure is made possible.

5. An improved process for measuring pressure differentials by means of manometer-like devices wherein differences in pressure between a first pressure sensing means and a second pressure sensing means produces changes in a first fluid level defined by a first liquid in one portion of said manometer-like device relative to a second fluid level defined by a second liquid in another portion of said manometer-like device, wherein said improved process comprises measuring changes in said first fluid level by:

transmitting a signal through said first liquid so that a characteristic of intensity of said signal is modulated to produce a modulated signal, wherein said characteristic varies with said first fluid level in accordance with the following relationship:

$$H = (\ln I^0_f / I_f) / k_f$$

wherein:

$I^0_f$ is an intensity of said signal, i.e., electromagnetic radiation, of frequency f before interaction with said first liquid;

$I_f$ is an intensity of said modulated signal, i.e., modulated electromagnetic radiation;

$k_f$ is a constant of said first liquid determined in accordance with Beer's Law; and H is the value in appropriate units for the thickness of said portion of said first liquid through which said signal is transmitted, and measuring changes in said characteristic.

* * * * *